United States Patent [19]
Oas et al.

[11] Patent Number: 5,910,326
[45] Date of Patent: Jun. 8, 1999

[54] BLOW MOLDING APPARATUS

[75] Inventors: David C. Oas, Vandalia; Jeffrey L. Patrick, Huber Heights, both of Ohio

[73] Assignee: Electra Form, Inc., Vandalia, Ohio

[21] Appl. No.: 08/931,166

[22] Filed: Sep. 16, 1997

[51] Int. Cl.⁶ .......................... B29C 31/08; B29C 49/64
[52] U.S. Cl. ..................... 425/526; 198/404; 198/740; 425/534
[58] Field of Search .................... 425/526, 534; 198/404, 736, 740

[56] References Cited

U.S. PATENT DOCUMENTS

| | | | |
|---|---|---|---|
| 3,850,566 | 11/1974 | Moore | 425/534 |
| 3,981,673 | 9/1976 | Sokolow | 425/534 |
| 4,057,386 | 11/1977 | Seefluth | 425/534 |
| 4,106,886 | 8/1978 | Sokolow | 425/526 |
| 4,251,203 | 2/1981 | Oas | 425/534 |
| 4,312,437 | 1/1982 | Suzuki et al. | 425/534 |
| 4,313,720 | 2/1982 | Spurr | 425/534 |
| 4,354,813 | 10/1982 | Collombin | 425/182 |
| 4,522,581 | 6/1985 | Schad et al. | 425/534 |
| 4,690,633 | 9/1987 | Schad et al. | 425/526 |
| 4,694,951 | 9/1987 | Gibbemeyer | 198/468.3 |
| 4,709,803 | 12/1987 | Swiderski | 198/468.2 |
| 5,516,274 | 5/1996 | Maggert | 425/526 |
| 5,683,729 | 11/1997 | Valles | 425/534 |
| 5,753,279 | 5/1998 | Takada et al. | 425/534 |
| 5,783,232 | 7/1998 | Roos et al. | 425/534 |

*Primary Examiner*—Robert Davis
*Attorney, Agent, or Firm*—Locke Reynolds

[57] ABSTRACT

A blow molding apparatus configured to receive plastic parisons and output blow molded containers including a support frame and a parison conveyor attached to the support frame and having a plurality of parison supports and a drive mechanism for driving the parison supports in a stepped movement circuit, advancing the parison supports by a curvilinear distance corresponding to a curvilinear spacing between a preselected number of parison supports. A first parison transfer assembly is adapted to receive the preselected number of the parisons from the parison supports. A second parison transfer assembly is adapted to receive the preselected number of the parisons from the first parison transfer assembly for transfer to a predetermined number blow mold stations during each stepped movement, and includes the predetermined number of second conveyors having a plurality of second parison supports and adapted for a second stepped movement to advance by a second curvilinear distance corresponding to a second curvilinear spacing between a chosen number of the second parison supports, the chosen number equal to the quotient of the preselected number and the predetermined number. An element for heating the parisons, a parison unloader for disgorging the blow molded containers, and a parison unloader are provided. A method of loading a preselected number of parisons onto a parison conveyor driven in a stepped movement, and transferring the preselected number of parisons to a predetermined number of blow mold stations using first and second parison transfer assemblies.

16 Claims, 6 Drawing Sheets

BLOW MOLDING APPARATUS

BACKGROUND OF THE INVENTION

1. Field of the Invention

The present invention generally relates to the field of blow molding methods and apparatus for producing plastic containers from parisons, and more particularly concerns blow molding methods and apparatus capable of producing a plurality of plastic containers from parisons during each operational cycle and utilizing a plurality of blow molding units.

2. Description of the Prior Art

Currently available blow molding apparatus, such as the apparatus described in U.S. Pat. No. 5,516,274, may utilize a blow mold assembly including a dual blow mold for simultaneously forming a pair of plastic containers from parisons with each operational cycle of the apparatus. In order to increase production rates of blow molding apparatus, it would be advantageous to increase the number of plastic containers blown with each operational cycle. Unfortunately, blow mold assemblies having blow molds for simultaneously forming more than two containers from parisons are presently impractical. As a result, despite the availability of such dual blow mold apparatus, there exists a need in the art for a method and apparatus for simultaneously forming more than two containers from parisons with each operational cycle, yet is capable of carefully and reliably handling parisons and containers in order to minimize defects.

SUMMARY OF THE INVENTION

In order to aid in the understanding of the present invention, it can be stated in essentially summary form that it is directed to method and apparatus for simultaneously forming a plurality of plastic containers from parisons during each operational cycle.

More specifically, the present invention includes an apparatus for blow molding, adapted to receive a plurality of plastic parisons and output a plurality of blow molded containers. The blow molding apparatus includes a parison conveyor attached to a support frame and including a plurality of parison supports and a drive mechanism for driving the parison supports in a planar, generally oval-shaped circuit having first and second linear segments and first and second curved segments. Each parison support is capable of supporting one parison, and the parison conveyor is driven by a drive mechanism. The drive mechanism is adapted for stepped movement whereby the parison supports are advanced during each stepped movement by a curvilinear distance corresponding to a curvilinear spacing between an even preselected number of adjacent parison supports. Heating elements may be provided and attached to the support frame proximate to the circuit for heating parisons prior to blow molding.

A parison loader is disposed proximate to the first linear segment and includes a loader tray and a plurality of pick arms. The loader tray defines a plurality of generally parallel delivery tracks disposed adjacent to a parison hopper assembly. The parisons may be delivered from the parison hopper assembly along the delivery tracks to the pick arms. Each pick arm includes a pair of opposing, movable pick arm jaws and is mounted along one side of a rotatable loader axle. The number of pick arms may preferably be chosen to be the preselected number, that is, equivalent to the preselected number of the parison supports. Each pick arm is adapted to engage or grab a parison delivered along a delivery track by pinching movement of the pick arm jaws actuated by air pressure supplied to pick arm jaw pneumatic actuators. After the pick arm jaws pinch together to grip the parisons, the pick arms rotate towards the parison supports due to rotation of the loader axle upon actuation of a pick arm rotation driver, to move the parisons from the loader tray to the parison supports. Thereafter, the pick arm jaws separate, releasing the parisons, so that the parisons are delivered to and are supported upon the parison supports. Preferably, the pick arm jaws engage, grab, rotate, and release the parisons for support upon the parison supports in coordination with each stepped movement of the drive mechanism.

As the parison supports advance relative to the parison loader during a plurality of stepped movements, each advancing parison support receives one parison, and adjacent pick arms move the parisons to support upon non-adjacent parison supports with uneven, separated spacings between adjacent pick arms. Several stepped movements of the parison conveyor are necessary to provide all of the parison supports moving past the parison loader with parisons. Positioning of parisons from adjacent pick arms on non-adjacent parison supports advantageously permits sufficient clearance space between adjacent pick arms to permit careful and reliable grabbing and releasing of the parisons to minimize parison defects, yet also permits each parison support passing by the parison loader to receive a parison.

An even, predetermined number of blow mold stations is also provided and disposed proximate to the second curved segment of the parison conveyor. After the parisons are heated by the heating elements, means for transferring the preselected number of parisons from the parison supports to the blow mold stations in coordination with each stepped movement of the drive mechanism are also provided, and include first and second parison transfer assemblies.

The first parison transfer assembly is disposed adjacent to the second curved segment of the parison conveyor and is adapted to receive the heated parisons from the parison supports. The first parison transfer assembly includes the preselected number of transfer arms, disposed outside the second curved segment, and extending generally radially from a center of curvature defined by the second curved segment. Each transfer arm includes a generally cylindrical transfer arm shaft mounted to and between opposing right angle end brackets. Each end bracket is in turn mounted to a block, and each block is mounted to a transfer arm beam assembly. A pair of support members are attached to the lower surface of the transfer assembly plate proximate to each transfer arm. The transfer arm beam assemblies are mounted between support members parallel to the transfer arm. Plate supports are provided at corners of a plate, mounting the plate to the support frame generally above the parison conveyor. Each transfer arm beam assembly further includes a beam upper portion having generally rectangular cross-section, secured to a beam lower portion having generally I-shaped cross-section.

An electromagnetic transfer arm motor is mounted surrounding each transfer arm shaft, for translation along the transfer arm shaft between the end brackets. Mounted to and beneath each transfer arm motor is a U-shaped bracket, and attached to and beneath each U-shaped bracket and surrounding the transfer arm beam assembly is a beam guide assembly. The beam guide assembly includes a pair of opposing side panels, a top panel, and a bottom panel, attached together with panel fasteners. The beam guide assembly further includes a lower plate mounted to the bottom panel and to a guide member defining a generally I-shaped slot having dimensions corresponding to but slightly larger than the beam lower portion. The guide member is adapted for engagement with the beam lower portion, and is supported on opposing sides by a pair of buttress members mounted to the lower plate. The beam guide assembly is capable of sliding movement along the transfer arm beam assembly, with the top panel in sliding contact with the beam upper portion, and the guide member in sliding contact with the beam lower portion. Attached to and beneath the bottom panel is an actuator mount, and attached to and beneath the actuator mount is a transfer arm pneumatic actuator. A pair of generally L-shaped grabber arms are mounted to the transfer arm pneumatic actuators, and an inwardly projecting, lower end of each grabber arm defines a semi-circular notch, adapted for grabbing the finish portion of a parison.

Each of the transfer arms is adapted to engage and move one of the parisons from a parison support to a second parison transfer assembly, in coordination with each stepped movement of the drive mechanism. The second parison transfer assembly is adapted to receive the preselected number of parisons from the first parison transfer assembly in coordination with each stepped movement of the drive mechanism, and transferring the parisons to the blow mold stations. The second parison transfer assembly includes second conveyors attached to the support frame, and the number of second conveyors may be selected to be equal to the predetermined number so that each blow mold station is associated with a second conveyor.

Each second conveyor includes a plurality of second parison supports and a second drive mechanism for driving the second parison supports in a generally oval-shaped second circuit. Each second circuit includes an outer linear portion, a first curved portion, an inner linear portion, and a second curved portion. The first curved portions are disposed proximate to the transfer arms, whereby the parisons are moveable from the second curved segment of the parison conveyor to the first curved portions of the second conveyors by action of the transfer arms. The blow mold stations are disposed adjacent to the outer linear portions. Each second parison support is capable of supporting a parison for movement along a second circuit to one of the blow mold stations after deposit from a transfer arm. The second drive mechanisms are adapted to cause each second conveyor to move in a second stepped movement, whereby the second parison supports are advanced during each second stepped movement by a second curvilinear distance corresponding to a second curvilinear spacing between a chosen number of adjacent second parison supports. The chosen number of the second parison supports may preferably be equal to the quotient of the preselected number and the predetermined number, that is, the chosen number may be equal the quotient of the preselected number of parison supports or pick arms, and the predetermined number of the blow mold stations or second conveyors.

Movement of the transfer arms is cyclical, in coordination with each stepped movement of the drive mechanism. By providing the preselected number of transfer arms, and by coordinating cyclical movements of the transfer arms with each stepped movement of the drive mechanism, the preselected number of parison supports and mounted parisons move to proximity with the second curved segment, and the preselected number of parisons are grabbed by the transfer arms with each stepped movement.

Movement of the transfer arms begins with the grabber arms moving together to grab the finish portion of a parison present on a parison support located at the second curved segment, in response to the transfer arm pneumatic actuator. After grabbing the parisons, the transfer arm pneumatic actuators cause the grabber arms and the parisons to move upward towards the plate, disengaging the parisons from the parison supports. Subsequently, activation of the transfer arm motors cause the motors to move along the transfer arm shafts, away from the end brackets nearest to the second curved segment, with the beam guide assemblies moving along the transfer arm beam assembly, translating the grabber arms and parisons generally radially away from the second curved segment. Translation continues until the motors are adjacent to the end brackets nearest to the second conveyors, whereupon each grabber arm and attached parison is positioned above a second parison support. Transfer arm pneumatic actuators then cause the grabber arms and parisons to move downwards, until each parison is mounted upon a second parison support. The transfer arm pneumatic actuators next cause the grabber arms to separate, disengaging from the parisons. In the final step in cyclical movement of the transfer arms, the motors move back along the transfer arm shafts radially inward towards the second curved segment, with translation ending at the end brackets.

Each blow mold station may include the chosen number of blow mold units, with each blow mold unit capable of blowing a parison into a blow molded container. In this way, each blow mold station may blow the chosen number of parisons into blow molded containers in coordination with each second stepped movement.

After each blow mold station has blown the chosen number of parisons into blow molded containers with each second stepped movement, the second conveyors support the blow molded containers for movement from the blow mold stations to a plurality of parison unloaders. Each parison unloader is disposed proximate to a second curved portion and capable of disgorging blow molded containers from a second conveyor. The parison unloaders preferably include the chosen number of unloader arms, equivalent to the number of parisons which are simultaneously blown into blow molded containers with each second stepped movement. The unloader arms are adapted to engage or grab a blow molded container by pinching movement of unloader arm jaws actuated by air pressure delivered to unloader arm jaw pneumatic actuators. After the unloader arm jaws pinch together to grip the blow molded containers, the unloader arms rotate away from the proximate second curved portion with rotation of the unloader axle resulting from actuation of unloader arm rotation driver. As a result, unloader arms act to move blow molded containers away from the present invention. Thereafter, the unloader arm jaw pneumatic actuators cause the unloader arm jaws to separate, releasing blow molded containers and consequently disgorging the blow molded containers from the present invention. The unloader arm jaws may simultaneously grip blow molded containers, rotate about the axis of the unloader axle to move the blow molded containers away from the second curved portions, and release blow molded containers in coordination with each second stepped movement.

Coordinator means for coupling and coordinating movements of the drive mechanism, the first parison transfer assembly, the second transfer assembly, the blow mold stations, and the parison unloaders is also provided. The coordinator means acts so that during each stepped movement of the parison conveyor, the parison supports advance anti-clockwise around the parison conveyor by a curvilinear distance corresponding to the curvilinear spacing between the preselected number of adjacent parison supports. Simultaneously, the second stepped movements of the second parison conveyors occur whereby the second parison supports advance around the second parison conveyors by a curvilinear distance corresponding to the curvilinear spacing between the chosen number of adjacent second parison supports, advancing from the first curved portion of each second conveyor towards the outer linear portion, with the parisons previously positioned on the second parison supports moving to the blow mold stations. The coordinator means acts so that after each stepped movement of the parison conveyor and second stepped movement of the second parison conveyors, the preselected number of parisons are loaded onto the parison supports at the first linear segment, the transfer arms grab the preselected number of previously loaded parisons from the parison supports disposed at the second curved segment, move the grabbed parisons to the second parison supports at the first curved portions and position the grabbed parisons on the second parison supports, blow mold the chosen number of parisons into blow molded containers at each blow mold station, and also disgorge the chosen number of blow molded containers from each parison unloader.

DESCRIPTION OF THE PREFERRED EMBODIMENTS

The following portion of the specification, taken in conjunction with the drawings, sets forth the preferred embodiments of the present invention. The embodiments of the invention disclosed herein are the best mode contemplated for carrying out this invention in a commercial environment, although it should be recognized and understood that various modifications can be accomplished within the parameters of the present invention.

Figure 1:
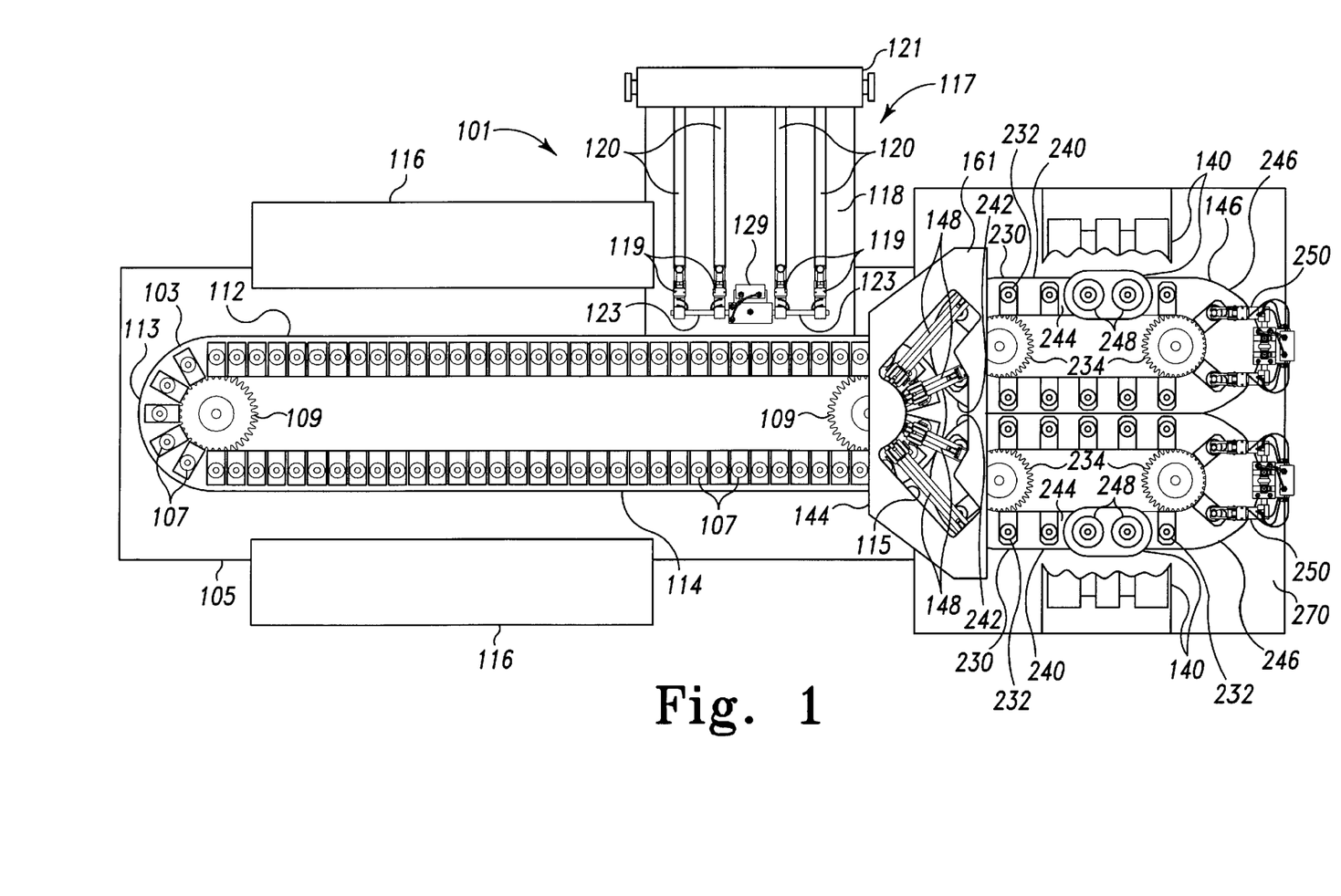
FIG. 1 is a plan view of a blow molding apparatus representing the present invention, with the blow mold stations depicted in a fragmentary manner.
Figure 2:
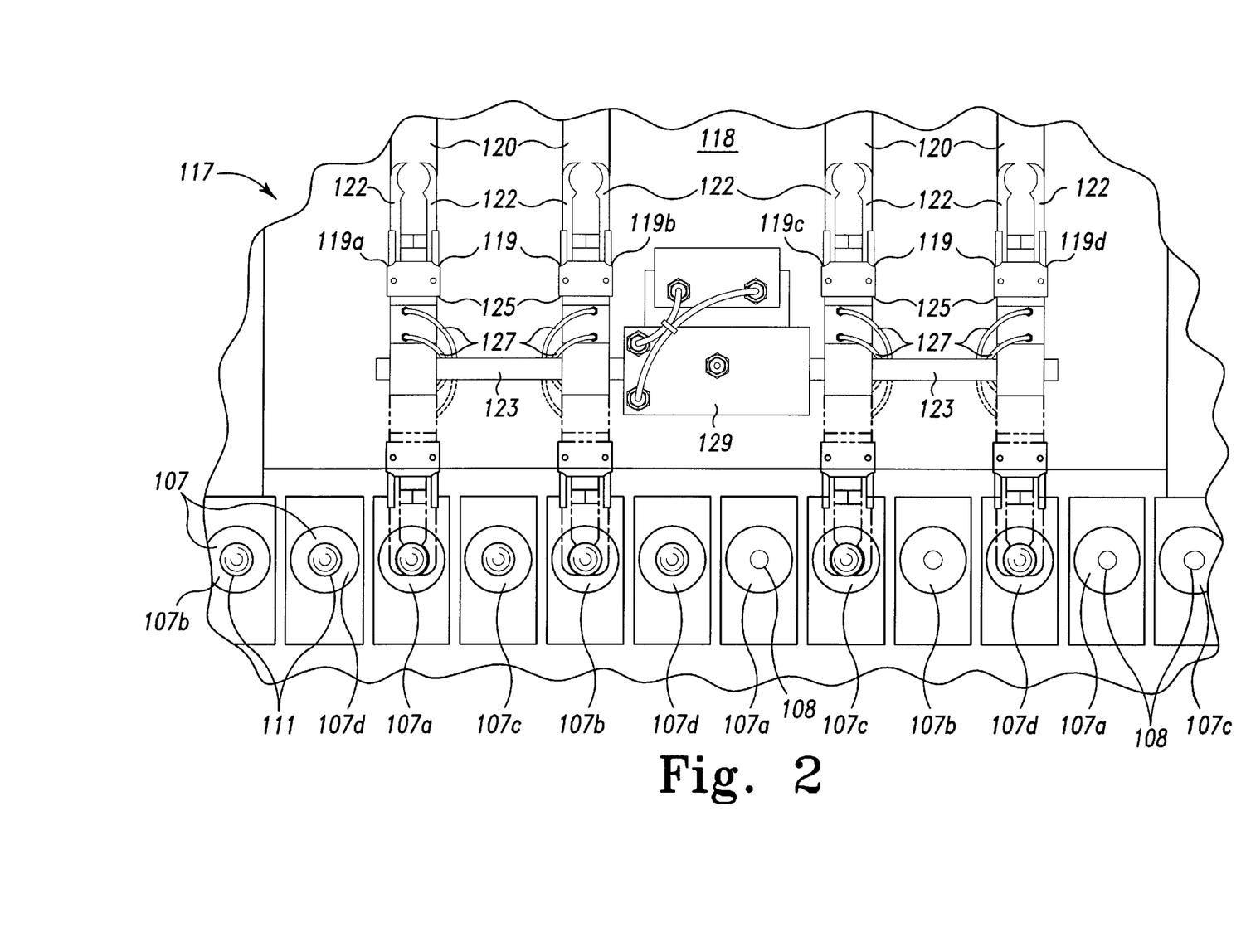
FIG. 2 is an enlarged detail plan view of a portion of the parison loader of a blow molding apparatus representing the present invention, with the pick arms rotated away from the parison supports shown in solid and the pick arms rotated towards the parison supports shown in phantom.

Referring now to the drawings for a detailed description of the present invention, reference is first made to FIG. 1, generally depicting blow molding apparatus 101 configured to receive a plurality of plastic parisons and output a plurality of blow molded containers. Blow molding apparatus 101 includes parison conveyor 103 attached to support frame 105, and parison conveyor 103 includes a plurality of parison supports 107 and drive mechanism 109 for driving parison supports 107 in a generally oval-shaped circuit. Each parison support 107 is capable of supporting one parison 111 on parison retainer 108, as shown in FIG. 2. Parison conveyor 103 moves in response to drive mechanism 109 in the generally oval-shaped circuit which includes first linear segment 112, first curved segment 113, second linear segment 114, and second curved segment 115. As depicted in FIG. 1, parison conveyor 103 moves in an anti-clockwise motion. Drive mechanism 109 is adapted for stepped movement whereby parison supports 107 are advanced during each stepped movement by a curvilinear distance corresponding to a curvilinear spacing between an even preselected number of adjacent parison supports 107. Heating elements 116 may be provided and attached to support frame 105 proximate to the circuit for heating parisons 111 supported upon parison supports 107 prior to blow molding.

As shown in FIGS. 1–2, parison loader 117 is disposed proximate to first linear segment 112. Parison loader 117 includes loader tray 118 and a plurality of pick arms 119. Loader tray 118 defines a plurality of generally parallel delivery tracks 120 disposed adjacent to parison hopper assembly 121, whereby parisons 111 may be delivered from parison hopper assembly 121 along delivery tracks 120 to pick arms 119. Each pick arm 119 has a pair of opposing, movable pick arm jaws 122 and is mounted along one side of rotatable loader axle 123. In a preferred embodiment, the number of pick arms 119 may be chosen to be the preselected number, that is, equivalent to the preselected number of parison supports 107. As depicted in FIGS. 1–2, the preselected number of pick arms 119 is four, and loader tray 118 correspondingly defines four parison delivery tracks 120. Each pick arm 119 is adapted to engage or grab a parison 111 delivered along a delivery track 120 by pinching movement of pick arm jaws 122 actuated by air pressure supplied to pick arm jaw pneumatic actuators 125 by air tubing 127. After pick arm jaws 122 pinch together to grip parisons 111, as shown in phantom in FIGS. 1–2, pick arms 119 rotate towards parison supports 107 due to rotation of loader axle 123 resulting from actuation of pick arm rotation driver 129. In this way, pick arms 119 move parisons 111 from loader tray 118 to parison supports 107. Thereafter, pick arm jaw pneumatic actuators 125 cause pick arm jaws 122 to separate, releasing parisons 111, whereby parisons 111 are delivered to and supported upon one of parison supports 107. Preferably, pick arm jaws 122 may simultaneously engage and grab parisons 111, rotatably move parisons 111 to parison supports 107, and release parisons 111 for support upon parison supports 107 in coordination with each stepped movement of drive mechanism 109.

It is a feature of the present invention that, as parison supports 107 advance relative to parison loader 117 during a plurality of stepped movements, each advancing parison support 107 receives one parison 111, and adjacent pick arms 119 move parisons 111 to support upon non-adjacent parison supports 107. For instance, as illustrated in FIGS. 1–2, where four pick arms 119 are provided and the preselected number is four, it is preferred that pick arms 119 are separated from each other so that one parison support 102 is disposed between outer pick arm 119a and inner pick arm 119b, and also between inner pick arm 119c and outer pick arm 119d, and two parison supports 107 are disposed between inner pick arms 119b and 119c. As shown in FIGS. 1–2, as a result of relative spacings between pick arm 119a–119d as described, and advancement of parison supports 107 by spacings between the preselected number of four during each stepped movement of parison conveyor 103, parison supports 107a are disposed to sequentially receive parisons 111 from pick arm 119a. Similarly, parison supports 107b are disposed to receive parisons 111 from pick arm 119b, parison supports 107c are disposed to receive parisons 111 from pick arm 119c, and parison supports 107d are disposed to receive parisons 111 from pick arm 119d. It will be recognized that as a result of the uneven, separated spacings between adjacent pick arms 119, several stepped movements of parison conveyor 103 are necessary to provide all parison supports 107 moving past parison loader 117 with parisons 111. In particular, as illustrated in FIGS. 1–2, where four pick arms 119 are provided, three stepped movements of parison conveyor 103 are required to provide the passing parison supports 107 with parisons 111. It will further be recognized that positioning of parisons 111 from adjacent pick arms 119 on non-adjacent parison supports 107 advantageously permits sufficient clearance space between adjacent pick arms 119 to permit careful and reliable grabbing and releasing parison 111, yet also permits each parison support 107 passing by parison loader 117 to receive a parison 111.

Figure 3:
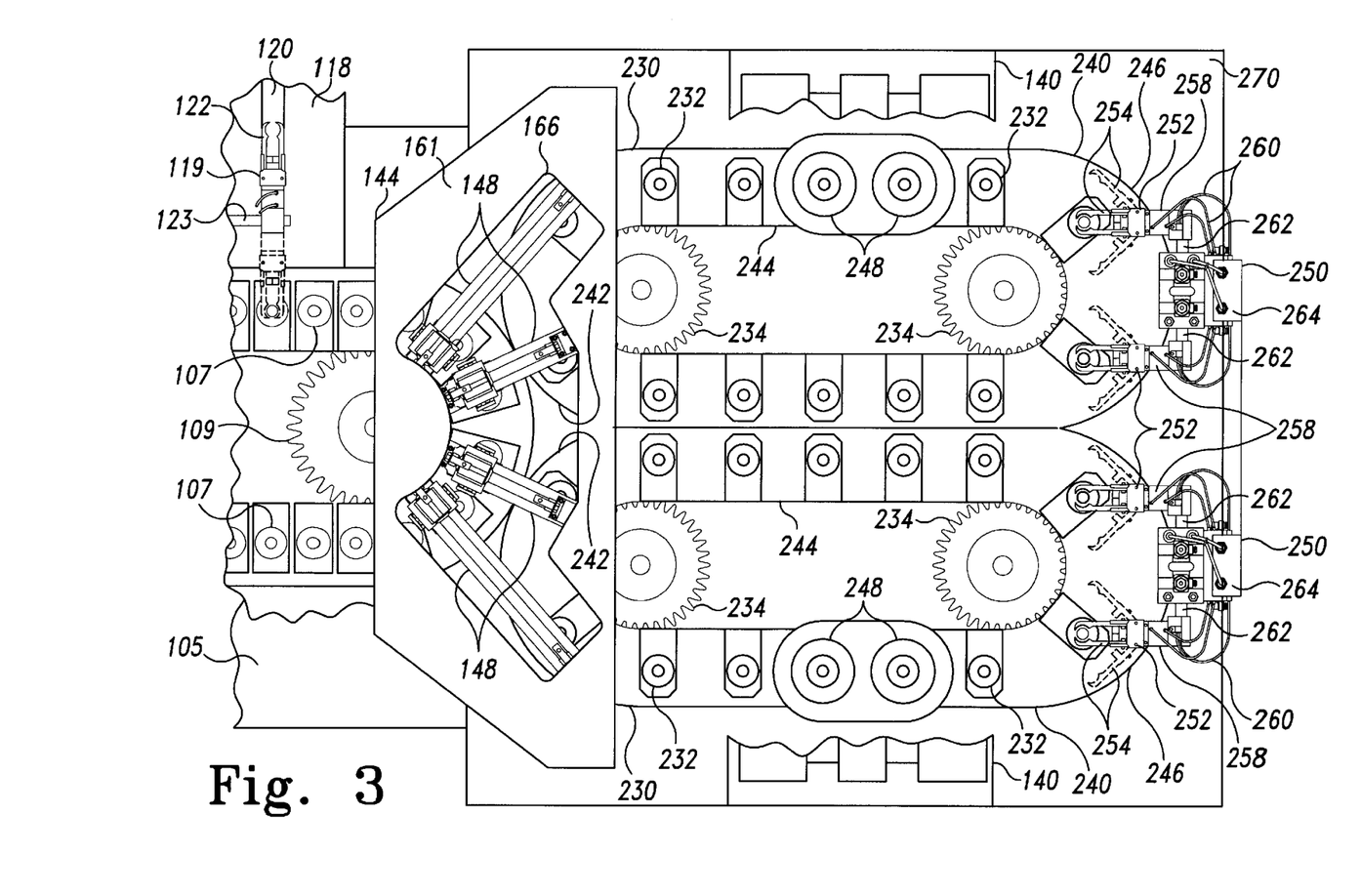
FIG. 3 is an enlarged detail plan view of the first and second parison transfer assemblies of a blow molding apparatus representing the present invention, with the blow mold stations depicted in a fragmentary manner and the pick arm rotated away from the parison support shown in solid and the pick arm rotated towards the parison support shown in phantom.

The present invention further includes an even predetermined number of blow mold stations 140 disposed proximate to second curved segment 115. For instance, as shown in FIGS. 1 and 3, two blow mold stations 140 are symmetrically disposed with respect to second curved segment 115. Blow mold stations 140 are illustrated in a fragmentary manner only and the operation of blow mold stations 140 will not be described in detail, for the reason that the characteristics of such blow mold stations are well known in the art, such as described in U.S. Pat. No. 5,516,274. Means for transferring the preselected number of parisons 111, after heating by heating elements 116, from parison supports 107 to blow mold stations 140 in coordination with each stepped movement of drive mechanism 109 are also provided, and include first and second parison transfer assemblies 144 and 146.

Figure 4:
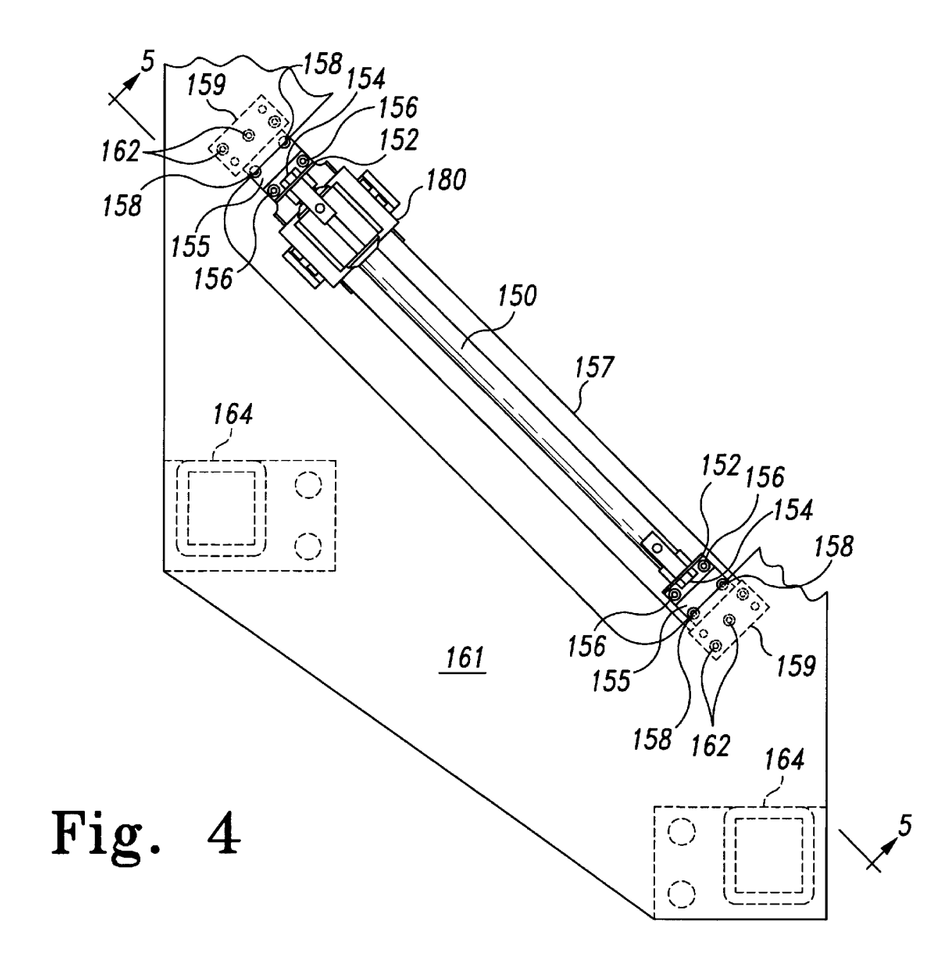
FIG. 4 is an enlarged detail plan view of a portion of the first parison transfer assembly of a blow molding apparatus representing the present invention, with the plate supports and support members shown in phantom, and the blocks shown partially in phantom.
Figure 5:
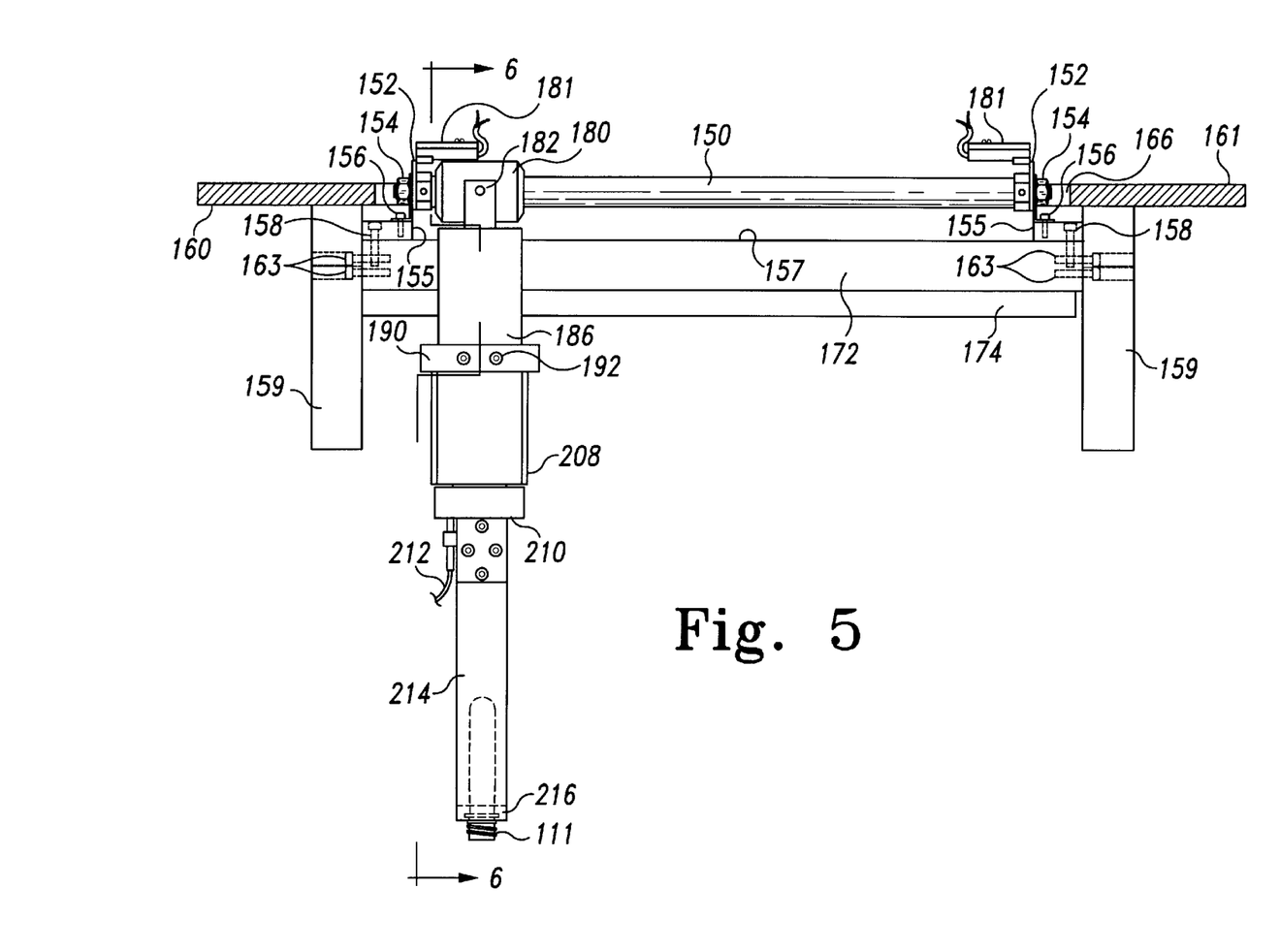
FIG. 5 is an enlarged side elevational view of a portion of the first parison transfer assembly, taken along line 5—5 of FIG. 4.
Figure 6:
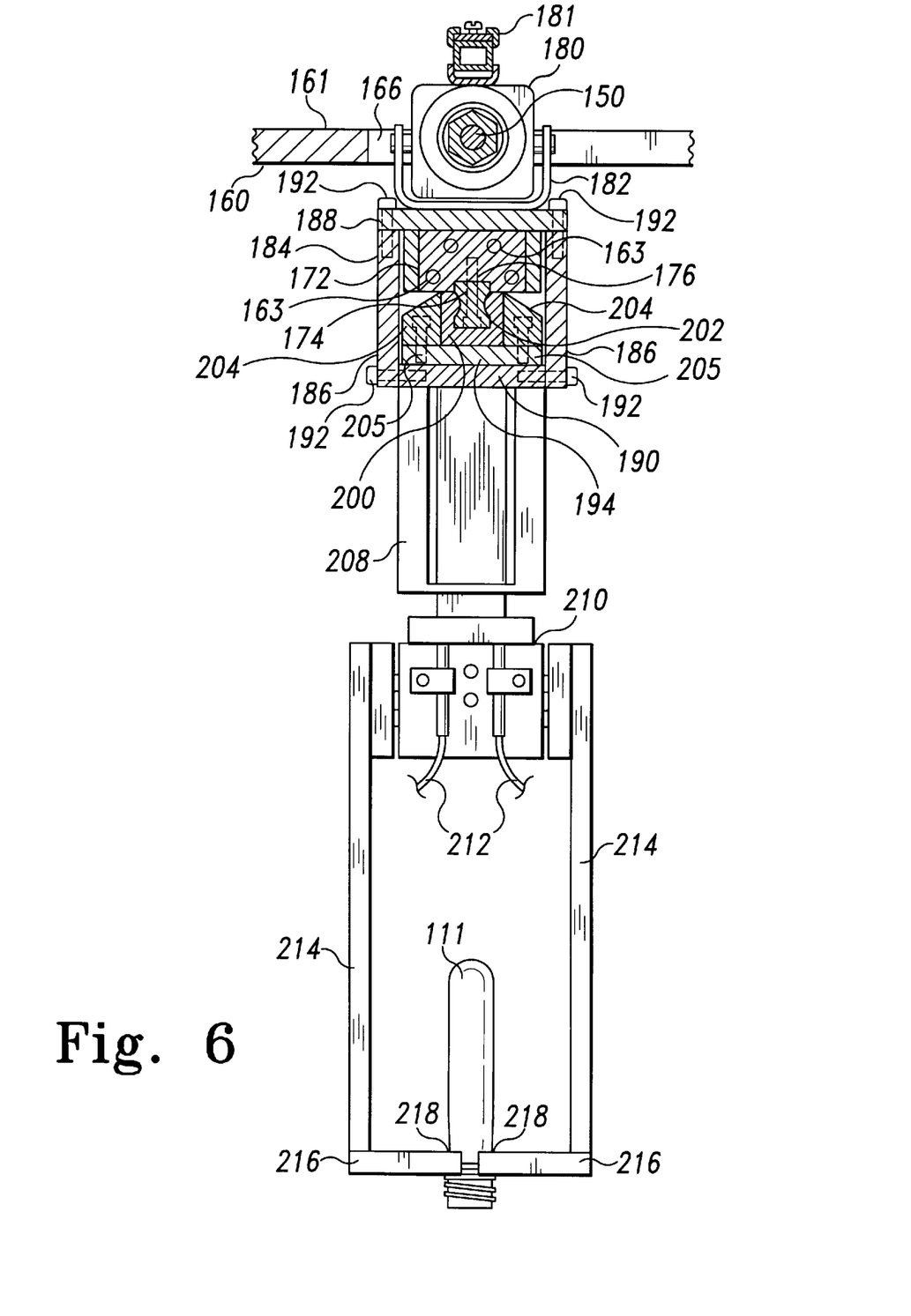
FIG. 6 is an enlarged end elevational view of a portion of the first parison transfer assembly, taken along line 6—6 of FIG. 5.

Referring to FIGS. 1 and 3–6, first parison transfer assembly 144 is disposed adjacent to second curved segment 115 and is adapted to receive parisons 111 from parison supports 107. First parison transfer assembly includes the preselected number of transfer arms 148. Transfer arms 148 are disposed outside second curved segment 115, and extend generally radially from a center of curvature defined by second curved segment 115. Each transfer arm includes generally cylindrical transfer arm shaft 150 mounted to and between opposing right angle end brackets 152 using shaft fasteners 154. Each end bracket 152 is in turn mounted to a block 155 with end bracket fasteners 156, and each block 155 is mounted to transfer arm beam assembly 157 with block fasteners 158. Proximate to each transfer arm 148, a pair of support members 159 are attached to lower surface 160 of transfer assembly plate 161 with support fasteners 162. Each transfer arm beam assembly 157 is mounted between support members 159 parallel to transfer arm 148 with transfer arm beam fasteners 163, shown, for instance, in phantom in FIGS. 5 and 6. Plate supports 164 are provided at corners of plate 161 to mount plate 161 to support frame 105 and generally above parison conveyor 103 so that plate aperture 166 defined by plate 161 is located above the region between conveyor 103 and blow mold stations 140, as depicted in FIG. 4. Each transfer arm beam assembly 157 includes beam upper portion 172 having generally rectangular cross-section, and beam lower portion 174 having generally I-shaped cross-section. Beam upper and lower portion 172 and 174 are secured together by beam fasteners 176 shown in phantom in FIG. 6.

Electromagnetic transfer arm motor 180 is mounted surrounding each transfer arm shaft 150, for translation along the transfer arm shaft 150 between end brackets 152 using electrical power supplied through connection members 181 mounted to end brackets 152. Mounted to and beneath each transfer arm motor 180 is U-shaped bracket 182. Attached to and beneath each U-shaped bracket 182 and surrounding transfer arm beam assembly 157 is beam guide assembly 184. Each beam guide assembly 184 includes a pair of opposing side panels 186, top panel 188, and bottom panel 190, attached together with panel fasteners 192 shown partially in phantom in FIG. 6. Each beam guide assembly 184 further includes lower plate 194 mounted to bottom panel 190 and to guide member 200 defining generally I-shaped slot 202 having dimensions corresponding to but slightly larger than beam lower portion 174. Each guide member 200 is adapted for engagement with beam lower portion 174, and is supported on opposing sides by a pair of buttress members 204 which are mounted to lower plate 194 by buttress fasteners 205 shown in phantom in FIG. 6. As will be described, each beam guide assembly 184 is capable of sliding movement along transfer arm beam assembly 157, with top panel 188 in sliding contact with beam upper portion 172, and guide member 200 in sliding contact with beam lower portion 174. Attached to and beneath each bottom panel 190 is actuator mount 208, and attached to and beneath each actuator mount 208 is transfer arm pneumatic actuator 210. Air for actuation of transfer arm pneumatic actuators 210 is supplied by transfer arm air tubing 212. A pair of generally L-shaped grabber arms 214 are mounted to each transfer arm pneumatic actuator 210. An inwardly projecting, lower end 216 of each grabber arm 214 defines a semi-circular notch 218, adapted for grabbing the finish portion of a parison 111, as will be described.

Each transfer arm 148 is adapted to engage and move one of parisons 111 from a parison support 107 to a second parison transfer assembly 146, in coordination with each stepped movement of drive mechanism 109. Second parison transfer assembly 146 is adapted to receive the preselected number of parisons 111 from first parison transfer assembly 144 in coordination with each stepped movement of drive mechanism 109, and transferring the parisons 111 to blow mold stations 140. Second parison transfer assembly 146 includes second conveyors 230 attached to support frame 105. The number of second conveyors 230 may be selected to be equal to the predetermined number, that is, equal to the number of blow mold stations 140, so that each blow mold station 140 is associated with one second conveyor 230.

As shown in FIGS. 1 and 3, two second conveyors 230 may be provided where two blow mold stations 140 are utilized. Each second conveyor 230 includes a plurality of second parison supports and second drive mechanism 234 for driving the plurality of second parison supports 232 in a generally oval-shaped second circuit. Each second circuit includes outer linear portion 240, first curved portion 242, inner linear portion 244, and second curved portion 246. First curved portions 242 are disposed proximate to transfer arms 148, whereby parisons 111 are moveable from second curved segment 115 of parison conveyor 103 to first curved portions 242 of second conveyors 230 by transfer arms 148. Blow mold stations 140 are disposed adjacent to outer linear portions 240. As depicted in FIGS. 1 and 3, the second parison conveyor 230 proximate to parison loader 117 moves in a clockwise motion, while the parison conveyor 230 distal to parison loader 117 moves in an anti-clockwise motion. Each second parison support 232 is capable of supporting a parison 111 for movement along a second circuit to one of blow mold stations 140 after deposit from transfer arm 148. Second drive mechanisms 234 are adapted to cause each second conveyor 230 to move in a second stepped movement, whereby second parison supports 232 are advanced during each second stepped movement by a second curvilinear distance corresponding to a second curvilinear spacing between a chosen number of adjacent second parison supports 232. The chosen number of second parison supports 232 is preferably equal to the quotient of the preselected number and the predetermined number. In other words, the chosen number may be equal the quotient of the preselected number of parison supports 107 or pick arms 119, and the predetermined number of blow mold stations 140 or second conveyors 230. As illustrated in FIGS. 1 and 3, the chosen number is seen to be two, for the reason that the preselected number of parison supports 107 and pick arms 119 is four, and the predetermined number of blow mold stations 140 and of second conveyors 230 is two. Consequently, second parison supports 232 of the second parison conveyor 230 proximate to parison loader 117 advance during each second stepped movement in a clockwise motion by a second curvilinear distance corresponding to a second curvilinear spacing between two adjacent second parison supports 232. Further, second parison supports of the second parison conveyor 230 distal to parison loader 117 advance during each second stepped movement in an anti-clockwise motion by a second curvilinear distance corresponding to a second curvilinear spacing between two adjacent second parison supports 232.

Movement of each transfer arm 148 is cyclical, in coordination with each stepped movement of drive mechanism 109. By providing the preselected number of transfer arms 148, and by coordinating cyclical movements of transfer arms 148 with each stepped movement of drive mechanism 109, the preselected number of parison supports 107 and mounted parisons 111 move to second curved segment 115, and the preselected number of parisons 111 are grabbed by transfer arms 148 with each stepped movement. With reference to FIG. 1, where the preselected number of four parison supports 107 move to second curved segment 115 with each stepped movement, four transfer arms 148 move to grab and remove four parisons 111. Two transfer arms 148 are positioned to move parisons 111 to second parison supports of the second conveyor 230 proximate to parison loader 117, and similarly, two transfer arms 148 are positioned to move parisons 111 to second parison supports of the second conveyor 230 distal to parison loader 117.

Cyclical movement of transfer arms 148 begins with grabber arms 214 moving together to grab the finish portion of a parison 111 disposed on a parison support 107 located at second curved segment 115, with grabbing action effectuated utilizing notch 218 and occurring in response to transfer arm pneumatic actuator 210. After grabbing parisons 111, transfer arm pneumatic actuators 210 cause grabber arms 214 and parisons 111 to move upward, towards plate 161, thereby disengaging parisons 111 from parison supports 107. Subsequently, activation of transfer arm motors 180 cause motors 180 to move along transfer arm shafts 150, away from the end brackets 152 nearest to second curved segment 115, with beam guide assemblies 184 moving along transfer arm beam assembly 157, translating grabber arms 214 and parisons 111 generally radially away from second curved segment 115. Translation continues until motors 180 are adjacent to the end brackets 152 nearest second conveyors 230, whereupon each grabber arm 214 and attached parison 111 is positioned above a second parison support 232. Next, transfer arm pneumatic actuators 210 cause grabber arms 214 and parisons 111 to move downwards, until each parison 111 is mounted upon a second parison support 232. Transfer arm pneumatic actuators 210 then cause grabber arms 214 to separate, disengaging from parisons 111. In the final step in cyclical movement of transfer arms 148, motors 180 move back along transfer arm shafts 150 radially inward towards second curved segment 115, with translation ending at end brackets 152. It will be recognized that as parison supports 107 move around second curved segment 115, the relative spacings between adjacent parison supports 107 increases as compared to the relative spacings when parison supports are disposed at first and second linear segments 112 and 114, thereby permitting sufficient clearance for grabber arms 214 to carefully and reliably grab and remove parisons 111 from parison supports 107, minimizing damage to parisons 111. Moreover, the curvilinear spacing between adjacent parison supports 107 is seen to be greater than the curvilinear spacing between adjacent second parison supports 232.

Each blow mold station 140 includes the chosen number of blow mold units 248, with each blow mold unit 248 capable of blowing a parison 111 into a blow molded container. Thus, each blow mold station 140 is adapted to simultaneously blow the chosen number of parisons 111 into blow molded containers in coordination with each second stepped movement. As depicted in FIGS. 1 and 3, each blow mold station 140 includes two blow mold units 248 and is capable of simultaneously blow molding two parisons 111 with each second stepped movement.

After each blow mold station 140 has blown the chosen number of parisons 111 into blow molded containers with each second stepped movement, second conveyors 230 support the blow molded containers for movement from blow mold stations 140 to parison unloaders 250. Each parison unloader 250 disposed proximate to a second curved portion 246 and capable of disgorging blow molded containers from a second conveyor 230. Each parison unloader 250 includes the chosen number of unloader arms 252, that is, equivalent to the number of parisons 111 which are simultaneously blown into blow molded containers with each second stepped movement. Each unloader arm 252 is adapted to engage or grab a blow molded container by pinching movement of unloader arm jaws 254 actuated by air pressure delivered to unloader arm jaw pneumatic actuators 258 by tubing 260. After unloader arm jaws 254 pinch together to grip the blow molded containers, as shown in phantom in FIG. 3, each unloader arm 252 rotates away from the proximate second curved portion 246 with rotation of unloader axle 262 resulting from actuation of unloader arm rotation driver 264. As a result, unloader arms 252 act to move blow molded containers away from the present invention. Thereafter, unloader arm jaw pneumatic actuators 258 cause unloader arm jaws 254 to separate, releasing blow molded containers and consequently disgorging the blow molded containers from the present invention. It is preferred that unloader arm jaws 254 simultaneously grip blow molded containers, rotate about the axis of unloader axle 262 to move the blow molded containers away from the second curved portions 246, and release blow molded containers in coordination with each second stepped movement. The present invention further includes coordinator means 270 for coupling and coordinating movements of drive mechanism 109, first parison transfer assembly 144, second transfer assembly 146, blow mold stations 140, and parison unloaders 250. Coordinator means 270 acts so that during each stepped movement of parison conveyor 103, parison supports 107 advance anti-clockwise around parison conveyor 103 by a curvilinear distance corresponding to the curvilinear spacing between the preselected number of adjacent parison supports 107, and simultaneously, the second stepped movements of second parison conveyors 230 occur whereby second parison supports 232 advance around second parison conveyors 230 by a curvilinear distance corresponding to the curvilinear spacing between the chosen number of adjacent second parison supports 232, advancing from first curved portion 242 of each second conveyor 230 towards outer linear portion 240, with parisons 111 previously positioned on second parison supports 107 moving to blow mold stations 140. Coordinator means 270 acts so that after each stepped movement of parison conveyor 103 and second stepped movement of second parison conveyors 230, the preselected number of parisons 111 are loaded onto parison supports 107 at first linear segment 112, transfer arms 148 grab the preselected number of previously loaded parisons 111 from parison supports 107 disposed at second curved segment 115, move the grabbed parisons 111 to second parison supports at first curved portions 242 and position the grabbed parisons 111 on second parison supports 232, blow mold the chosen number of parisons 111 into blow molded containers at each blow mold station 140, and, in addition, disgorge the chosen number of blow molded containers from each parison unloader 250. Coordinator means 270 may utilize any of a variety of well-known apparatus for coupling and coordinating the operations of the present invention, including, for instance, mechanical, electrical, fluid, and/or computer components.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. A blow molding apparatus configured to receive a plurality of plastic parisons and output a plurality of blow molded containers, the blow molding apparatus comprising:
    a support frame;
    a parison conveyor attached to the support frame and having a plurality of parison supports and a drive mechanism for driving the parison supports in a circuit, each parison support capable of supporting one of the parisons and the drive mechanism adapted for stepped movement whereby the parison supports are advanced during each stepped movement by a curvilinear distance corresponding to a curvilinear spacing between an even preselected number of the parison supports; and
    a parison loader including the preselected number of pick arms, each pick arm adapted to engage and move one of the parisons to support upon one of the parison supports in coordination with each stepped movement of the drive mechanism, so that as the parison supports advance relative to the parison loader during a plurality of stepped movements, each advancing parison support receives one of the parisons, and adjacent pick arms move the parisons to support upon non-adjacent parison supports.

2. The blow molding apparatus as recited in claim 1, further comprising:
    an even predetermined number of blow mold stations; and
    means for transferring the preselected number of the parisons from the parison supports to the blow mold stations in coordination with each stepped movement of the drive mechanism.

3. The blow molding apparatus as recited in claim 2, wherein the parison conveyor includes a curved segment, and the means for transferring the parisons includes a first parison transfer assembly adapted to receive the parisons from the parison supports and including the preselected number of transfer arms, and a second parison transfer assembly adapted to receive the preselected number of the parisons from the first parison transfer assembly in coordination with each stepped movement of the drive mechanism for transfer to the blow mold stations, each transfer arm disposed outside and extending generally radially from a center of curvature of the curved segment, and adapted to engage and move one of the parisons from one of the parison supports to the second parison transfer assembly in coordination with each stepped movement of the drive mechanism.

4. The blow molding apparatus as recited in claim 3, wherein the second parison transfer assembly includes the predetermined number of second conveyors attached to the support frame, each second conveyor having a plurality of second parison supports and a second drive mechanism for driving the plurality of second parison supports in a second circuit, each second parison support capable of supporting one of the parisons for movement from one of the transfer arms to one of the blow mold stations, each second drive mechanism adapted for a second stepped movement whereby the second parison supports of each of the second conveyors are advanced during each second stepped movement by a second curvilinear distance corresponding to a second curvilinear spacing between a chosen number of the second parison supports, the chosen number equal to the quotient of the preselected number and the predetermined number.

5. The blow molding apparatus as recited in claim 4, further comprising a coordinator for coordinating movements of the drive mechanism, the first parison transfer assembly, the second transfer assembly, and the blow mold stations.

6. A blow molding apparatus as recited in claim 1, further comprising:
    an even predetermined number of blow mold stations;
    a first parison transfer assembly adapted to receive the preselected number of the parisons from the parison supports in coordination with each stepped movement of the drive mechanism; and
    a second parison transfer assembly adapted to receive the preselected number of the parisons from the first parison transfer assembly in coordination with each stepped movement of the drive mechanism for transfer to the blow mold stations, including the predetermined number of second conveyors attached to the support frame, each second conveyor having a plurality of second parison supports and a second drive mechanism for driving the plurality of second parison supports in a second circuit, each second parison support capable of supporting one of the parisons for movement from the second parison transfer assembly to one of the blow mold stations, each second drive mechanism adapted for a second stepped movement whereby the second parison supports of each of the second conveyors are advanced during each second stepped movement by a second curvilinear distance corresponding to a second curvilinear spacing between a chosen number of the second parison supports, the chosen number equal to the quotient of the preselected number and the predetermined number.

7. A blow molding apparatus configured to receive plastic parisons and output blow molded containers, the blow molding apparatus comprising:

a support frame;

a parison conveyor attached to the support frame and having a plurality of parison supports, a curved segment, and a drive mechanism for driving the parison supports in a circuit, each parison support capable of supporting one of the parisons and the drive mechanism adapted for stepped movement whereby the parison supports are advanced during each stepped movement by a curvilinear distance corresponding to a curvilinear spacing between an even preselected number of the parison supports;

an even predetermined number of blow mold stations;

a first parison transfer assembly adapted to receive the preselected number of the parisons from the parison supports in coordination with each stepped movement of the drive mechanism and including the preselected number of transfer arms, each transfer arm disposed outside and extending generally radially from a center of curvature of the curved segment; and a second parison transfer assembly adapted to receive the preselected number of the parisons from the first parison transfer assembly in coordination with each stepped movement of the drive mechanism for transfer to the blow mold stations, each transfer arm adapted to engage and move one of the parisons from one of the parison supports to the second parison transfer assembly in coordination with each stepped movement of the drive mechanism.

8. The blow molding apparatus as recited in claim 7, wherein the second parison transfer assembly includes the predetermined number of second conveyors, each second conveyor having a plurality of second parison supports and a second drive mechanism for driving the plurality of second parison supports in a second circuit, each second parison support capable of supporting one of the parisons for movement from the second parison transfer assembly to one of the blow mold stations, each second drive mechanism adapted for a second stepped movement whereby the second parison supports of each of the second conveyors are advanced during each second stepped movement by a second curvilinear distance corresponding to a curvilinear spacing between a chosen number of the second parison supports, the chosen number equal to the quotient of the preselected number and the predetermined number.

9. A blow molding apparatus configured to receive plastic parisons and output blow molded containers, the blow molding apparatus comprising:

a support frame;

a parison conveyor attached to the support frame and having a plurality of parison supports and a drive mechanism for driving the parison supports in a circuit, each parison support capable of supporting a parison and the drive mechanism adapted for stepped movement whereby the parison supports are advanced during each stepped movement by a curvilinear distance corresponding to a curvilinear spacing between an even preselected number of the parison supports;

an even predetermined number of blow mold stations;

a first parison transfer assembly adapted to receive the preselected number of the parisons from the parison supports in coordination with each stepped movement of the drive mechanism and including the preselected number of transfer arms; and a second parison transfer assembly adapted to receive the preselected number of the parisons from the first parison transfer assembly in coordination with each stepped movement of the drive mechanism for transfer to the blow mold stations, each transfer arm adapted to engage and move one of the parisons from one of the parison supports to the second parison transfer assembly in coordination with each stepped movement of the drive mechanism, including the predetermined number of second conveyors, each second conveyor having a plurality of second parison supports and a second drive mechanism for driving the plurality of second parison supports in a second circuit, each second parison support capable of supporting one of the parisons for movement from the second parison transfer assembly to one of the blow mold stations, each second drive mechanism adapted for a second stepped movement whereby the second parison supports of each of the second conveyors are advanced during each second stepped movement by a second curvilinear distance corresponding to a second curvilinear spacing between a chosen number of the second parison supports, the chosen number equal to the quotient of the preselected number and the predetermined number.

10. The blow molding apparatus as recited in claims 1, 4, 7, or 9, further comprising at least one heating element attached to the support frame proximate to the circuit for heating the parisons supported upon the parison supports.

11. The blow molding apparatus as recited in claims 4, 6, 8, or 9, further comprising at least one parison unloader for disgorging the blow molded containers, and wherein the second conveyors are adapted to support the blow molded containers for movement from the blow mold stations to the at least one parison unloader.

12. The blow molding apparatus as recited in claims 4, 6, 8, or 9, wherein each blow mold station is adapted to blow the chosen number of parisons into blow molded containers in coordination with each second stepped movement.

13. The blow molding apparatus as recited in claim 12, wherein the chosen number is two.

14. The blow molding apparatus as recited in claim 13, wherein the preselected number of parison supports is four.

15. The blow molding apparatus as recited in claim 13, wherein the preselected number of parison supports is eight.

16. A blow molding apparatus configured to receive plastic parisons and output blow molded containers, the blow molding apparatus comprising:

a support frame and heating means fixed to the frame for heating parisons to a temperature suitable to permit blow molding;

a parison conveyor attached to the support frame and having a plurality of parison supports, a curved segment, and a drive mechanism for driving the parison supports in a circuit in proximity to the heating means, each parison support capable of supporting one of the parisons and the drive mechanism moving the parison conveyor in stepped movement whereby the parison supports are advanced during each stepped movement by an even preselected number of the parison supports;

a parison transfer assembly attached to the support frame and receiving the preselected number of the parisons from the parison supports in coordination with each stepped movement of the drive mechanism and including the preselected number of transfer arms, each transfer arm disposed outside and extending outwardly from a center of curvature of the curved segment;

an even predetermined number of blow mold stations coupled to the support frame; and the predetermined number of second conveyors supported by the support frame and receiving the preselected number of the parisons from the parison transfer assembly in coordination with each stepped movement of the drive mechanism for transfer to the blow mold stations, each second conveyor having a plurality of second parison supports and a second drive mechanism for driving the plurality of second parison supports in a second circuit in a second stepped movement, each transfer arm engaging and moving one of the parisons from one of the parison supports of the parison conveyor to one of the second parison supports of one of the second conveyors in coordination with each stepped movement of the drive mechanisms.

* * * * *